(12) United States Patent
Hoshino et al.

(10) Patent No.: US 11,400,638 B2
(45) Date of Patent: Aug. 2, 2022

(54) METHOD FOR MANUFACTURING LIQUID-FILLED CONTAINER

(71) Applicant: YOSHINO KOGYOSHO CO., LTD., Tokyo (JP)

(72) Inventors: Hideaki Hoshino, Tokyo (JP); Mitsuru Shiokawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 17/270,124

(22) PCT Filed: Jun. 25, 2019

(86) PCT No.: PCT/JP2019/025190
§ 371 (c)(1),
(2) Date: Feb. 22, 2021

(87) PCT Pub. No.: WO2020/044756
PCT Pub. Date: Mar. 5, 2020

(65) Prior Publication Data
US 2021/0178652 A1    Jun. 17, 2021

(30) Foreign Application Priority Data
Aug. 30, 2018    (JP) .............................. JP2018-161548

(51) Int. Cl.
*B29C 49/46*    (2006.01)
*B29C 49/12*    (2006.01)
(52) U.S. Cl.
CPC .............. *B29C 49/46* (2013.01); *B29C 49/12* (2013.01); *B29C 2049/4652* (2013.01)

(58) Field of Classification Search
CPC . B29C 49/46; B29C 49/58; B29C 2049/4664; B29C 2049/5803; B29C 49/12
See application file for complete search history.

(56) References Cited

U.S. PATENT DOCUMENTS

| 6,514,451 B1 | 2/2003 | Boyd et al. |
| 2008/0029928 A1 | 2/2008 | Andison et al. |

(Continued)

FOREIGN PATENT DOCUMENTS

| CN | 104136195 A | 11/2014 |
| CN | 104684708 A | 6/2015 |

(Continued)

OTHER PUBLICATIONS

Mar. 2, 2021 International Preliminary Report on Patentability issued in International Patent Application No. PCT/JP2019/025190.

(Continued)

*Primary Examiner* — Robert B Davis
(74) *Attorney, Agent, or Firm* — Oliff PLC

(57) ABSTRACT

A liquid container manufacturing method includes: a liquid blow molding step of molding a preform into a liquid container having a shape conforming to an inner surface of a blow-molding mold, by supplying a pressurized liquid to an interior of the preform through a supply path in a state where a blow nozzle is engaged to a mouth of the preform; and a headspace forming step of forming a headspace in the liquid container, by discharging the liquid from an interior of the liquid container through a discharge port in a discharge rod extending to the interior of the liquid container through the blow nozzle, by introducing a pressurized gas to the interior of the liquid container through a gas inflow path in a state where the supply path is closed.

9 Claims, 8 Drawing Sheets

(56) References Cited

U.S. PATENT DOCUMENTS

| | | | |
|---|---|---|---|
| 2011/0135778 A1 | 6/2011 | Andison et al. | |
| 2012/0266567 A1 | 10/2012 | Haesendonckx et al. | |
| 2013/0307197 A1 | 11/2013 | Haesendonckx et al. | |
| 2014/0135778 A1* | 5/2014 | Tipirneni | A61B 17/00491 606/93 |
| 2014/0367895 A1 | 12/2014 | Sato et al. | |
| 2016/0052653 A1 | 2/2016 | Domeier | |
| 2017/0100873 A1 | 4/2017 | Tabata et al. | |
| 2020/0171733 A1* | 6/2020 | Shiokawa | B29C 49/12 |

FOREIGN PATENT DOCUMENTS

| | | |
|---|---|---|
| JP | 2000-043129 A | 2/2000 |
| JP | 2009-533290 A | 9/2009 |
| JP | 2013-132861 A | 7/2013 |
| JP | 5806929 B2 | 11/2015 |
| JP | 2018-075823 A | 5/2018 |

OTHER PUBLICATIONS

Sep. 24, 2019 International Search Report issued in International Patent Application No. PCT/JP2019/025190.
Apr. 21, 2022 Extended European Search Report issued in European Patent Application No. 19854913.1.
May 18, 2022 Office Action issued in Chinese Patent Application No. 201980055862.5.

\* cited by examiner

METHOD FOR MANUFACTURING LIQUID-FILLED CONTAINER

TECHNICAL FIELD

This application relates to a liquid container manufacturing method for manufacturing, from a synthetic resin preform, a liquid container containing a content liquid.

BACKGROUND

Synthetic resin containers, typical examples of which include a polypropylene (PP) bottle and a polyethylene terephthalate (PET) bottle, have been used to contain, as content liquids, a variety of liquids, such as beverages, cosmetic products, pharmaceutical products, detergents, and toiletries including shampoo. Such a container is typically manufactured by blow molding a preform which has been formed of a thermoplastic synthetic resin material as described above.

Known techniques for blow molding the preform into the container include liquid blow molding in which, instead of pressurized air, a pressurized liquid is used as a pressurizing medium to be supplied to an interior of the preform.

For example, Patent Literature 1 describes a liquid blow molding method in which the synthetic resin preform, after having been heated in advance to a temperature at which stretchability is achieved, is placed in a blow-molding mold, and the liquid which is pressurized to a predetermined pressure using a pressurizing unit, such as a pump, is supplied to the interior of the preform through a blow nozzle. In this way, the synthetic resin preform is molded into the container having a predetermined shape conforming to a cavity of the blow-molding mold.

By using, as the liquid to be supplied to the preform, the content liquid that is to be contained in the container as a final product, the above liquid blow molding method allows molding of the container to occur concurrently with filling of the content liquid to the container, so as to manufacture the liquid container containing the content liquid. The liquid container manufacturing method using the liquid blow molding therefore omits the step of filling the content liquid to the molded container, thereby allowing low-cost manufacturing of the liquid container.

CITATION LIST

Patent Literature

PTL 1: JP 5806929 B2

SUMMARY

Technical Problem

In the aforementioned conventional liquid blow molding method, it is generally required to form a headspace having a desired dimension in the molded container. One likely method to form the headspace is, for example, to draw in, immediately after the molding of the liquid container, the liquid in an interior of the container through the blow nozzle to create a negative pressure in the interior of the container and subsequently expose the interior of the container to the atmosphere and introduce air into the container, thereby forming the headspace. However, the liquid that is present in the interior of the container immediately after the molding is entrained with air that used to be present in the interior of the preform and so bubbled. In the above method, therefore, the bubbled liquid is inevitably introduced to a liquid supply path communicating with the blow nozzle. Air entrapped in the supply path may cause an issue such as deterioration in stability of molding conditions, moldability of the container, and the like.

It would be helpful to provide a liquid container manufacturing method with which the liquid container may be manufactured with high accuracy so as to achieve a predetermined capacity and shape.

Solution to Problem

One aspect of the present disclosure resides in a liquid container manufacturing method for manufacturing, from a synthetic resin preform, a liquid container containing a content liquid using a nozzle unit and a blow-molding mold, wherein the nozzle unit includes a supply path for the liquid that extends to a blow nozzle, a discharge path for the liquid that extends to a discharge port provided in a discharge rod, a gas outflow path through which a gas flows out from the blow nozzle, and a gas inflow path which is provided separately from the gas outflow path and through which the gas flows into the blow nozzle. The liquid container manufacturing method includes: a liquid blow molding step of molding the preform into the liquid container having a shape conforming to an inner surface of the blow-molding mold, by supplying the liquid pressurized by a pressurized liquid supply source to an interior of the preform through the supply path in a state in which the blow nozzle is engaged to a mouth of the preform; and a headspace forming step of forming a headspace in the liquid container, by introducing the gas that is pressurized to an interior of the liquid container through the gas inflow path in a state in which the supply path is closed, thereby discharging the liquid from the interior of the liquid container through the discharge port provided in the discharge rod extending to the interior of the liquid container through the blow nozzle.

In a preferred embodiment of the liquid container manufacturing method configured as above, the nozzle unit includes a common path for the liquid that extends from the pressurized liquid supply source to a branching portion, and the supply path extends from the branching portion to the blow nozzle, and the discharge path extends from the branching portion to the discharge port provided in the discharge rod.

In another preferred embodiment of the liquid container manufacturing method configured as above, the liquid container manufacturing method further includes an air discharge step, performed prior to the liquid blow molding step, of discharging air in the interior of the preform to outside through the gas outflow path, by supplying the liquid to the interior of the preform.

In still another preferred embodiment of the liquid container manufacturing method configured as above, in the headspace forming step, by operating the pressurized liquid supply source in a drawing direction, the liquid is discharged from the interior of the liquid container through the discharge port provided in the discharge rod.

In still another preferred embodiment of the liquid container manufacturing method configured as above, in the headspace forming step, by operating the pressurized liquid supply source in a drawing direction before discharging the liquid from the interior of the liquid container through the discharge port provided in the discharge rod, the liquid is discharged from the interior of the liquid container through the supply path.

In still another preferred embodiment of the liquid container manufacturing method configured as above, the liquid container manufacturing method further includes a rod purging step of discharging, through the discharge port provided in the discharge rod, the liquid to the interior of the preform prior to the molding and/or in the course of the molding into the liquid container.

In still another preferred embodiment of the liquid container manufacturing method configured as above, in the rod purging step, an entire amount of the liquid that has been discharged from the interior of the liquid container through the discharge port in the last headspace forming step is discharged through the discharge port.

In still another preferred embodiment of the liquid container manufacturing method configured as above, in the rod purging step, the discharge of the liquid through the discharge port provided in the discharge rod is performed in the liquid.

In still another preferred embodiment of the liquid container manufacturing method configured as above, an amount of the liquid discharged from the interior of the liquid container through the discharge port in the headspace forming step is less than or equal to an internal volume of the discharge path.

In still another preferred embodiment of the liquid container manufacturing method configured as above, the liquid container manufacturing method further includes a rod stretching step, performed in the course of the liquid blow molding step or prior to the liquid blow molding step, of stretching the preform in an axial direction by a stretching rod, wherein the discharge rod is the stretching rod.

Advantageous Effect

The present disclosure provides a liquid container manufacturing method with which the liquid container may be manufactured with high accuracy so as to achieve the predetermined capacity and shape.

DETAILED DESCRIPTION

Hereinafter, the present disclosure will be described in more details with reference to the drawings.

Figure 1:
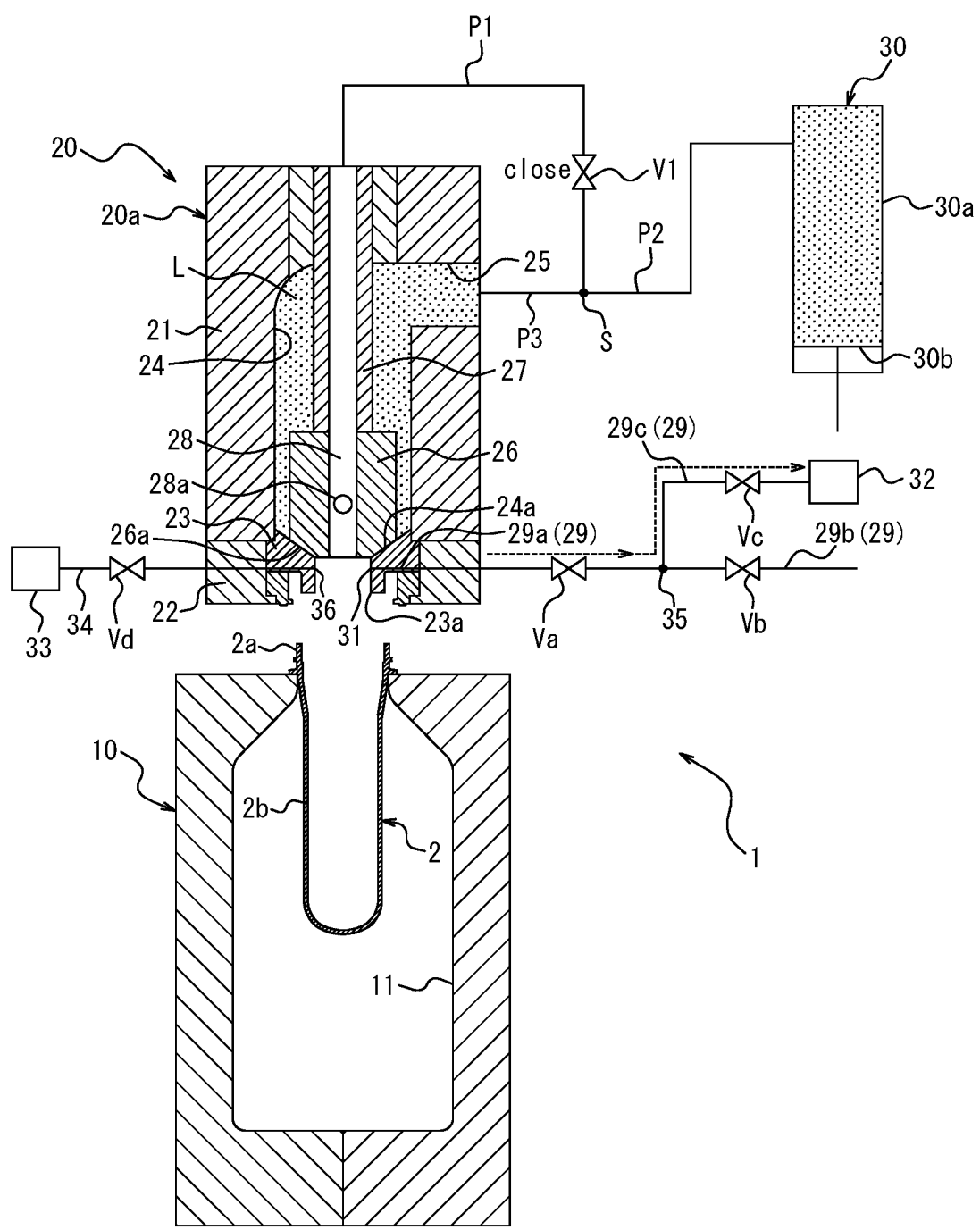
FIG. 1 illustrates an example of a liquid container manufacturing apparatus used for a liquid container manufacturing method according to an embodiment of the present disclosure in a standby step.

A liquid container manufacturing method according to an embodiment of the present disclosure may be implemented by using, for example, a liquid container manufacturing apparatus 1 which is configured as illustrated in FIG. 1. The liquid container manufacturing apparatus 1 of FIG. 1 manufactures, from a synthetic resin preform 2, a liquid container C (refer to FIG. 4) that contains a content liquid. Examples of liquids (i.e., content liquids) L which can be contained in the liquid container C may include a variety of liquids L, such as beverages, cosmetic products, pharmaceutical products, detergents, and toiletries including shampoo.

The preform 2 that can be used is, for example, a preform that has been formed by a thermoplastic resin material, such as polypropylene (PP) and polyethylene terephthalate (PET), in a closed-bottom tubular shape having a cylindrical-shaped mouth 2a, which serves as an opening end, a cylindrical-shaped trunk 2b, which is contiguous with the mouth 2a and which has a closed lower end.

Although not illustrated in details, the mouth 2a is provided, on an outer wall surface thereof, with an engagement protrusion which allows a closing cap (which is not illustrated) to be attached to the mouth 2a of the molded liquid container C by plugging (i.e., undercut engagement). Additionally, a male screw may also be provided on the outer wall surface of the mouth 2a instead of the engagement protrusion, and the closing cap may be attached to the mouth 2a by screw connection.

The liquid container manufacturing apparatus 1 includes a blow-molding mold 10. The blow-molding mold 10 has a cavity 11, which has a shape corresponding to a final shape, such as a bottle shape, of the liquid container C. The cavity 11 is open upward at an upper surface of the blow-molding mold 10. The preform 2 is placed in the blow-molding mold 10, with the trunk 2b being arranged inside the cavity 11 of the blow-molding mold 10 and with the mouth 2a protruding upward from the blow-molding mold 10.

The blow-molding mold 10 may be opened into left and right mold halves, and, by opening the blow-molding mold 10 into the left and right mold halves after molding the preform 2 into the liquid container C, the liquid container C may be removed from the blow-molding mold 10.

Above the blow-molding mold 10, there is provided a nozzle unit 20, which is configured to supply the pressurized liquid L into the preform 2. The nozzle unit 20 includes a body block 21.

The body block 21 is provided, in a lower end thereof, with a support block 22. The support block 22 supports a blow nozzle 23, which is attached to the lower end of the body block 21. The blow nozzle 23 is formed in substantially a cylindrical shape and has a lower end portion in which a liquid supply port 23a is defined. The body block 21, the support block 22, and the blow nozzle 23 constitute a nozzle unit body 20a. The nozzle unit body 20a is displaceable in a vertical direction relative to the blow-molding mold 10. When the nozzle unit body 20a descends to its lowermost stroke end, the nozzle unit body 20a (or, more concretely, the blow nozzle 23) comes into sealing engagement from above to the mouth 2a of the preform 2 which is placed in the blow-molding mold 10.

The nozzle unit body 20a (or, more concretely, the body block 21 and the blow nozzle 23) is provided, inside thereof, with a longitudinal flow path 24, which extends to the liquid supply port 23a of the blow nozzle 23. The longitudinal flow path 24 extends in the vertical direction.

The nozzle unit body 20a (or, more concretely, the body block 21) is provided with a supply port 25, which communicates to an upper end of the longitudinal flow path 24.

The nozzle unit body 20a (or, more concretely, the blow nozzle 23) includes a ring-shaped (annular-shaped) seat 24a, which is provided in the longitudinal flow path 24. The ring-shaped seat 24a is defined by an upper surface of the blow nozzle 23. The ring-shaped seat 24a may be defined by an inner circumferential surface of the blow nozzle 23 or may be defined by the upper surface and the inner circumferential surface of the blow nozzle 23. The ring-shaped seat 24a is formed by a conical-shaped surface tapering downward. The shape of the ring-shaped seat 24a may be, however, changed as appropriate. Inside the longitudinal flow path 24, there is arranged a sealing body 26, which is configured to open and close (the seat 24a of) the longitudinal flow path 24. The sealing body 26 is formed in a cylindrical shape and has a lower end provided with a tapered surface 26a, which has a conical shape tapering downward. When being displaced to a closing position, that is, the lowermost stroke end position, the sealing body 26, at the tapered surface 26a, abuts against the upper surface (i.e., the seat 24a) of the blow nozzle 23 to thereby close (the seat 24a of) the longitudinal flow path 24. Although the tapered surface 26a is provided at the lower end of the sealing body 26, its arrangement may be changed as appropriate. Further, although the tapered surface 26a has the conical shape tapering downward, its shape may be changed as appropriate. On the other hand, when the sealing body 26 is displaced upward from the closing position, a lower end surface of the sealing body 26 lifts off from the upper surface (i.e., the seat 24a) of the blow nozzle 23 to thereby open (the seat 24a of) the longitudinal flow path 24.

The sealing body 26 is displaceable between the closing position in which (the seat 24a of) the longitudinal flow path 24 is closed and an opening position in which (the seat 24a of) the longitudinal flow path 24 is opened to a maximum degree of opening which is the maximum degree of opening in a liquid blow molding step. More specifically, the sealing body 26 is displaceable between the closing position (refer to FIG. 1), a preliminary opening position (refer to FIG. 2), and the opening position (refer to FIG. 4). In the preliminary opening position, the degree of opening of the sealing body 26 for opening and closing (the seat 24a of) the longitudinal flow path 24 is smaller than the degree of opening in the opening position. Preferably, an effective sectional area of the longitudinal flow path 24 in the preliminary opening position is not more than 10% of the effective sectional area of the longitudinal flow path 24 in the opening position. Note that the effective sectional area herein refers to the effective sectional area of a flow path defined between the sealing body 26 and the blow nozzle 23. As illustrated in FIG. 1, the sealing body 26 is fixed to a shaft body 27, which is provided in a manner such that the shaft body 27 is displaceable in the vertical direction relative to the nozzle unit body 20a, so that the sealing body 26 is displaceable in the vertical direction inside the longitudinal flow path 24. Additionally, the sealing body 26 may be formed integrally with the shaft body 27.

The nozzle unit 20 includes a discharge rod 28 provided with a discharge port 28a. The discharge rod 28, which is formed in a substantially cylindrical shape from a steel material or the like, extends along an axial center of the shaft body 27 and the sealing body 26. The discharge rod 28 may be driven by a driving source which is not illustrated and is displaceable in the vertical direction relative to the shaft body 27 and the sealing body 26. The discharge port 28a communicates with a first pipe P1 via a hollow (which is not illustrated) in the discharge rod 28. More specifically, the hollow in the discharge rod 28 has a lower end portion that communicates with the discharge port 28a, and the hollow in the discharge rod 28 has an upper end portion that communicates with the first pipe P1. The first pipe P1 is provided with a rod valve V1, which is configured to open and close the first pipe P1. Additionally, the rod valve V1 is preferably configured by a solenoid valve that may be controlled by a control apparatus. In the present embodiment, the discharge rod 28 has a closed lower end, and the discharge port 28a is provided on a circumferential wall of the discharge rod 28. Accordingly, when the discharge rod 28 is returned to the original position after a headspace HS (refer to FIG. 7) is formed in the container C, liquid-dripping is unlikely to occur. The present disclosure, however, is not limited to the above configuration, and the discharge port 28a may be provided on a lower end surface of the discharge rod 28, or may be provided on both the lower end surface and the circumferential wall of the discharge rod 28.

The discharge rod 28 may be used as a stretching rod as in the present embodiment. By being displaced downward, the discharge rod 28 stretches the preform 2 in an axial direction.

Figure 2:
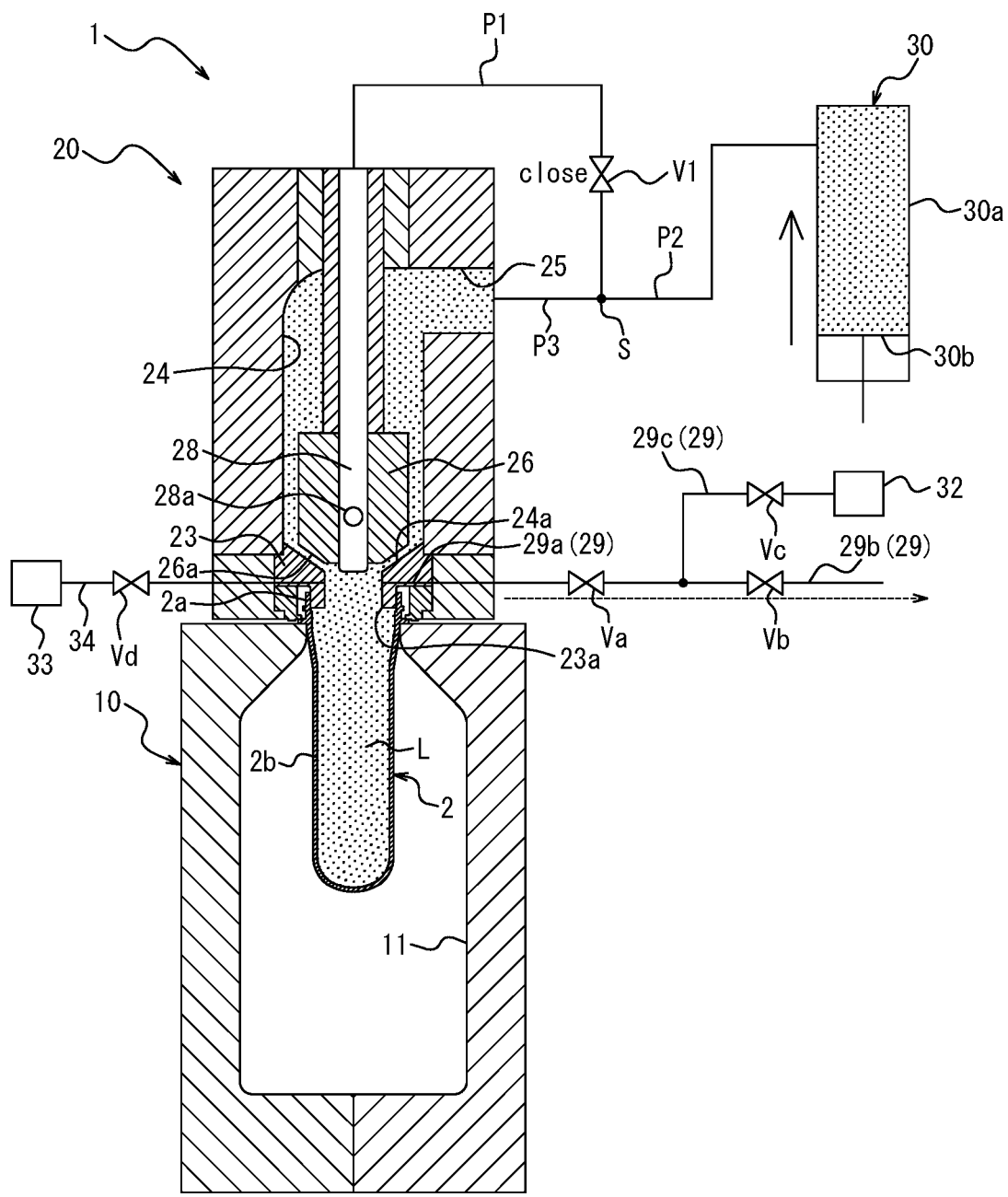
FIG. 2 illustrates the liquid container manufacturing apparatus in an air discharge step.
Figure 3:
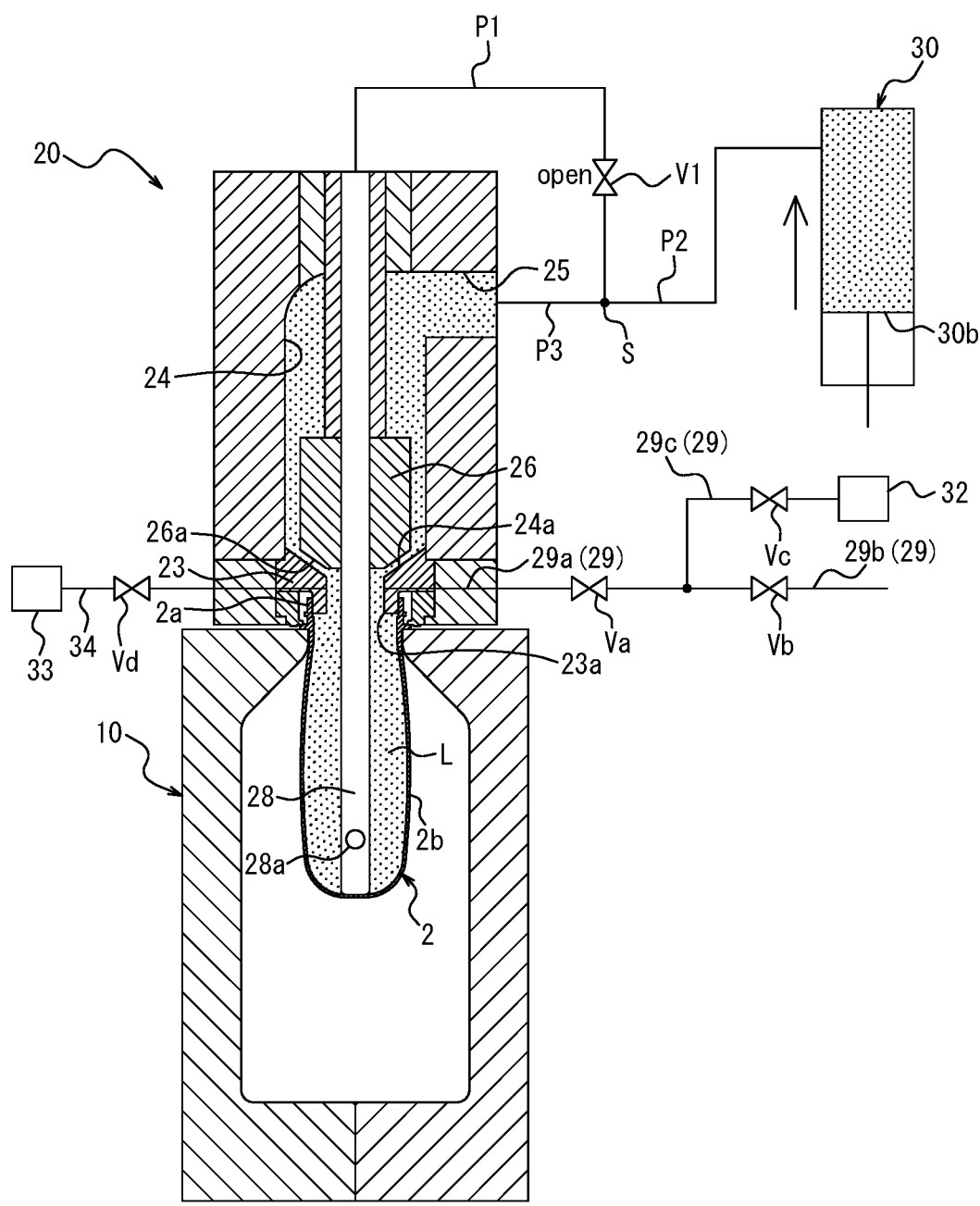
FIG. 3 illustrates the liquid container manufacturing apparatus in a rod purging step and a liquid blow molding step.
Figure 4:
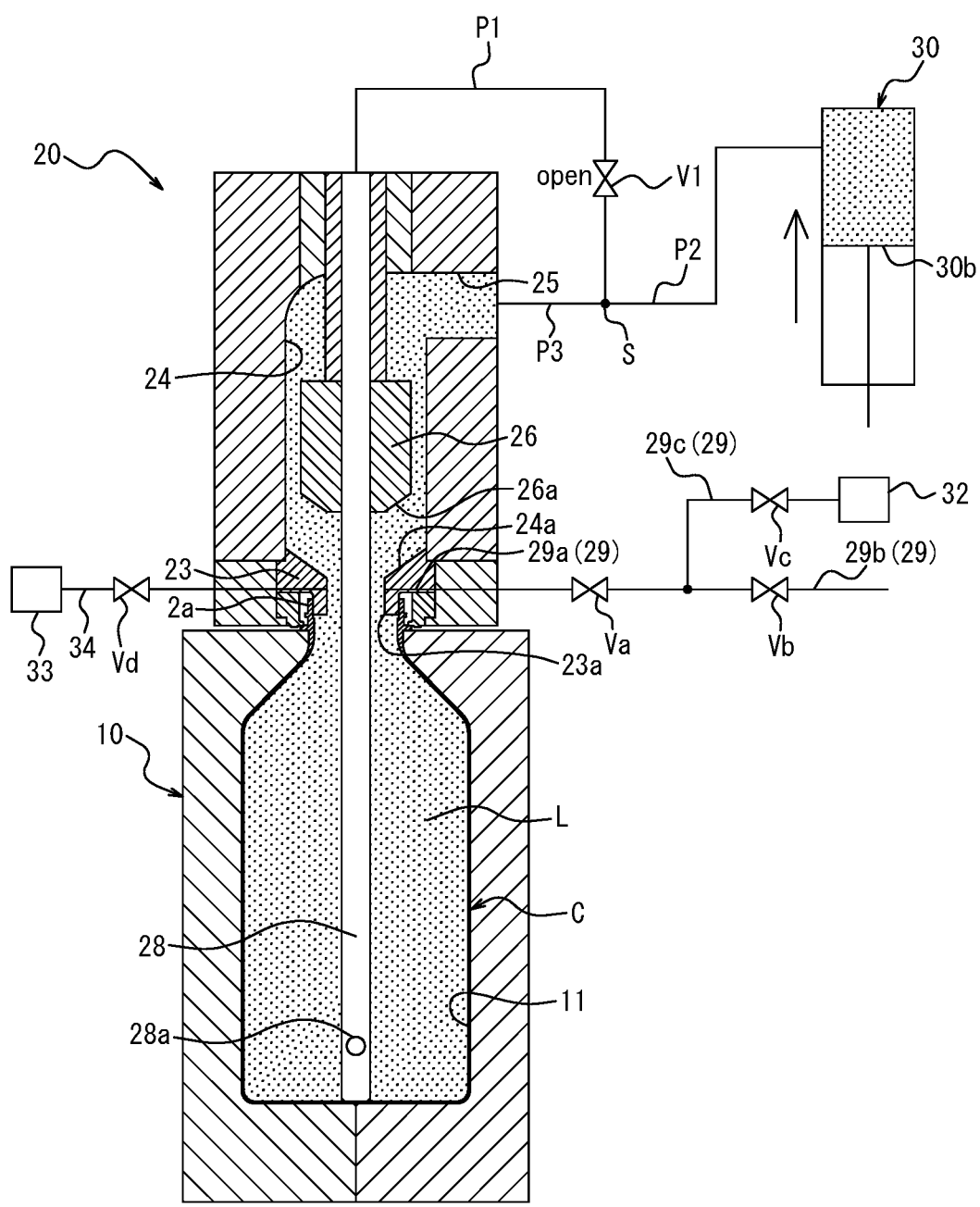
FIG. 4 illustrates the liquid container manufacturing apparatus upon completion of the liquid blow molding step.
Figure 8:
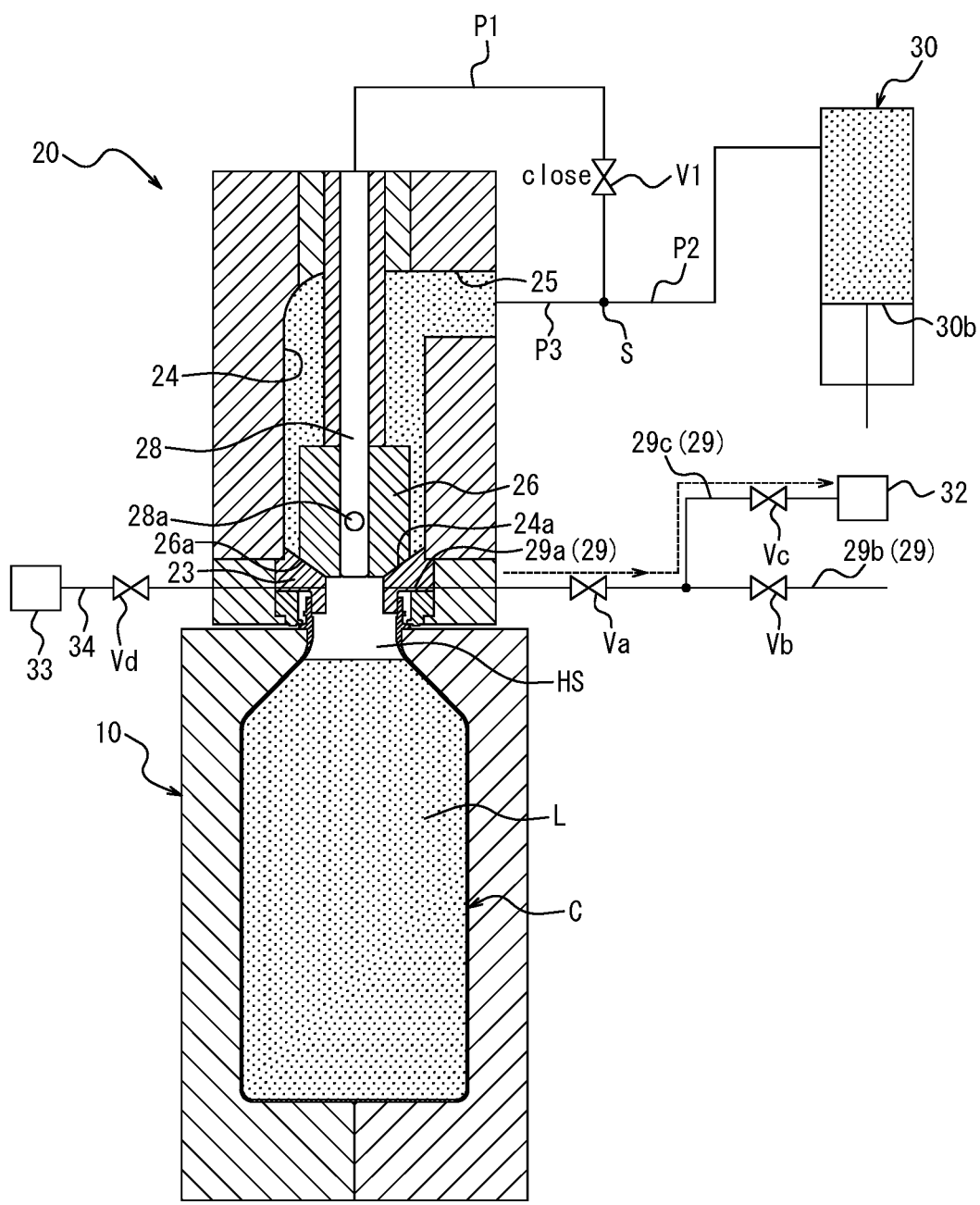
FIG. 8 illustrates the liquid container manufacturing apparatus in a rod-ascending and depressurizing step.

Inside (the nozzle unit body 20a of) the nozzle unit 20, there is provided a gas outflow path 29 through which a gas (e.g., air in this embodiment) flows out from the blow nozzle 23. The gas outflow path 29 is connected to an outflow opening 31, which is provided in a portion in a later-described supply path (the supply path being formed by a third pipe P3, the supply port 25, and the longitudinal flow path 24) that is located on a downstream side of the seat 24a (e.g., on the inner circumferential surface of the blow nozzle 23 in this embodiment). The gas outflow path 29 is configured to be alternatively brought into a drawing state in which the outflow opening 31 is connected to a drawing source 32, an exposed-to-atmosphere state in which the outflow opening 31 is connected to the atmosphere, or a closed state in which the outflow opening 31 is blocked from any of the drawing source 32 and the atmosphere, in a selectable manner. As illustrated in FIGS. 1 and 8, by bringing the gas outflow path 29 into the drawing state, the content liquid adhered to or remaining in the blow nozzle 23 may be drawn, whereby liquid-dripping from the blow nozzle 23 may be prevented. When the content liquid is unlikely to drip or when the dripping may be tolerated, for example, the gas outflow path 29 does not need to be brought into the drawing state (and a third path 29c and the drawing source 32 may be omitted). As illustrated in FIG. 2, by bringing the gas outflow path 29 into the exposed-to-atmosphere state, in an air discharge step, air in an interior of the preform 2 may be discharged to the atmosphere (i.e., outside) through the gas outflow path 29. Depending on conditions, in the air discharge step, the path 29 may also be brought into the drawing state instead of the exposed-to-atmosphere state, to thereby discharge the air from the interior of the preform 2. As illustrated in FIGS. 3 and 4, by bringing the gas outflow path 29 into the closed state, in the liquid blow molding step, the pressurized liquid L may be stably supplied to the interior of the preform 2. The drawing source 32 may be configured by, for example, a drawing pump or the like. A part or an entirety of the gas outflow path 29 may be provided inside (the nozzle unit body 20a of) the nozzle unit 20.

In the present embodiment, as illustrated in FIG. 1, the gas outflow path 29 includes a first path 29a in which a first valve Va is provided, a second path 29b in which a second valve Vb is provided, and the third path 29c in which a third valve Vc is provided. The first path 29a has one end connected to the outflow opening 31, and has another end connected to the discharge branching portion 35. The second path 29b has one end connected to the discharge branching portion 35, and has another end exposed to the atmosphere. The third path 29c has one end connected to the discharge branching portion 35, and has another end connected to the drawing source 32. The first through the third valve Va through Vc are each preferably configured by a solenoid valve. The first valve Va is preferably arranged as close as possible to the outflow opening 31; such arrangement reduces a volume of a path between the outflow opening 31 and the first valve Va, and prevents occurrence of bubbling and impact on the headspace H, adhesion of the liquid L to the mouth 2a due to occurrence of liquid-dripping, or the like that are caused by backflow of the liquid L remaining after entering the path.

Inside (the nozzle unit body 20a of) the nozzle unit 20, there is provided, separately from the gas outflow path 29, a gas inflow path 34 through which the pressurized gas (which is hereinafter also referred to as a pressurized gas and which may be pressurized air in the present embodiment) flows into the blow nozzle 23 and is introduced to an interior of the liquid container C. The gas inflow path 34 is connected to an inflow opening 36, which is provided separately from the outflow opening 31 in a portion in the supply path that is located on the downstream side of the seat 24a (e.g., on the inner circumferential surface of the blow nozzle 23 in the present embodiment). The gas inflow path 34 is configured to be alternatively brought into a pressurized state in which the gas inflow path 34 is connected to a pressurized gas supply source 33, which is configured to supply the pressurized gas, or a closed state in which the inflow opening 36 is blocked from the pressurized gas supply source 33, in a selectable manner. In the present embodiment, as illustrated in FIG. 1, the gas inflow path 34 is provided with a fourth valve Vd, and the gas inflow path 34 has one end connected to the inflow opening 36, and has another end connected to the pressurized gas supply source 33. The fourth valve Vd is preferably configured by a solenoid valve. The fourth valve Vd is preferably arranged as close as possible to the inflow opening 36; such arrangement reduces a volume of a path between the inflow opening 36 and the fourth valve Vd, and prevents the occurrence of bubbling and impact on the headspace H, the adhesion of the liquid L to the mouth 2a due to the occurrence of liquid-dripping, or the like that are caused by the backflow of the liquid L remaining after entering the path.

To the supply port 25, a pressurized liquid supply source 30 is connected through a second pipe P2. The pressurized liquid supply source 30 may be configured, for example, by a plunger pump including a cylinder 30a and a piston (e.g., plunger) 30b.

As illustrated in FIGS. 3 and 4, by operating in a positive direction (i.e., pressurizing direction) in a state in which the blow nozzle 23 is in sealing engagement to the mouth 2a of the preform 2 placed in the blow-molding mold 10 and in which the sealing body 26 opens the longitudinal flow path 24, the pressurized liquid supply source 30 may supply the pressurized liquid L to the interior of the preform 2 via the second pipe P2, the third pipe P3, the supply port 25, (the seat 24a of) the longitudinal flow path 24, and the liquid supply port 23a. The second pipe P2 splits into the first pipe P1 and the third pipe P3 at a branching portion S. The nozzle unit 20 includes a common path that is formed by the second pipe P2 extending from the pressurized liquid supply source 30 to the branching portion S, the supply path that is formed by the third pipe P3 extending from the branching portion S to the supply port 25, the supply port 25, and the longitudinal flow path 24, and a discharge path (including the first pipe P1) that extends from the branching portion S to the discharge port 28a provided in the discharge rod 28.

Figure 7:
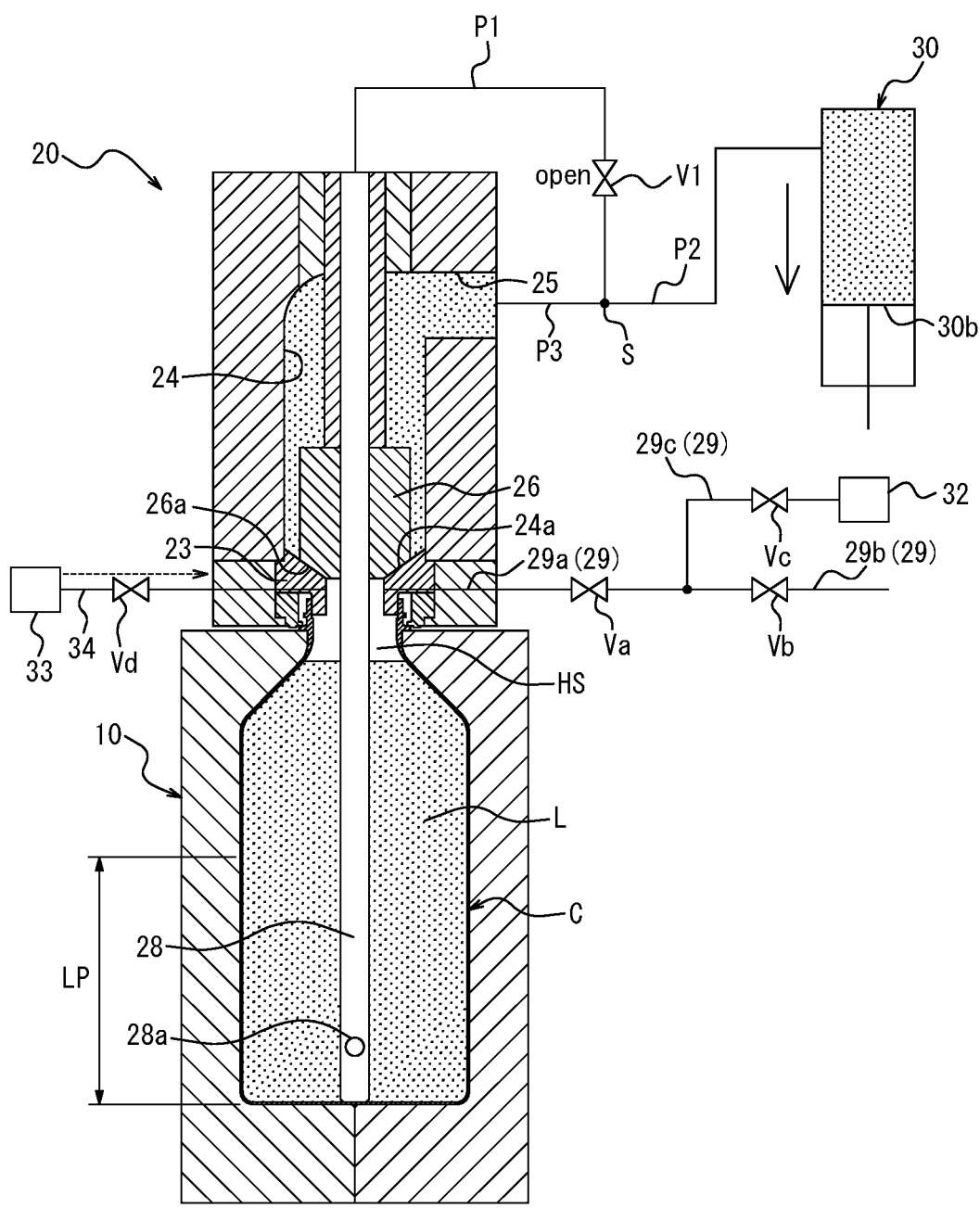
FIG. 7 illustrates the liquid container manufacturing apparatus when a second stage of suck-back is started from a state illustrated in FIG. 6 and a headspace is being formed in the headspace forming step.

As illustrated in FIG. 7, by operating in an opposite direction in a state in which the sealing body 26 closes the longitudinal flow path 24 and in which the rod valve V1 is opened, the pressurized liquid supply source 30 may discharge the liquid L from the interior of the liquid container C into the discharge path extending from the discharge port 28a to the branching portion S through the discharge port 28a of the discharge rod 28.

By operating in the opposite direction in a state in which the sealing body 26 closes the longitudinal flow path 24 and in which the rod valve V1 is closed, the pressurized liquid supply source 30 may draw the liquid L contained in a supply tank which is not illustrated into the cylinder 30a, so as to prepare for the next liquid blow molding.

Operations of the nozzle unit body 20a, the sealing body 26, the discharge rod (i.e., stretching rod) 28, the pressurized liquid supply source 30 (i.e., plunger 30b), the rod valve V1, the first through the fourth valve Va through Vd, the drawing source 32, the pressurized gas supply source 33, or the like are subject to integrated control by the control apparatus which is not illustrated.

Next, a method for molding, from the synthetic resin preform 2, the liquid container C in which the liquid (i.e., content liquid) L is contained in a container having a predetermined shape using the liquid container manufacturing apparatus 1 with the above configuration (i.e., a liquid container manufacturing method according to the present embodiment) will be described.

Firstly, a standby step is performed. In the standby step, a preform 2 which has been heated in advance to a predetermined temperature (e.g., 80° C. to 150° C.) around which stretchability is achieved using a heating device (which is not illustrated), such as a heater, is placed in the blow-molding mold 10, and the blow-molding mold 10 is closed.

At this time, as illustrated in FIG. 1, the nozzle unit 20 is located above and off the blow-molding mold 10, and the sealing body 26 closes the seat 24a. Further, the gas inflow path 34 is in the closed state, and the gas outflow path 29 is in the drawing state. More specifically, the first valve Va is opened, the second valve Vb is closed, the third valve Vc is opened, and the fourth valve Vd is closed. At this time, since the mouth 2a of the preform 2 is opened, the preform 2 is filled with air.

Next, in the present embodiment, the air discharge step is performed. In the air discharge step, as illustrated in FIG. 2, the nozzle unit 20 is caused to descend to engage the blow nozzle 23 to the mouth 2a of the preform 2, the gas outflow path 29 is brought into the exposed-to-atmosphere state while the gas inflow path 34 remains in the closed state, the sealing body 26 is brought into the preliminary opening position, and the plunger 30b is operated at a first rate (i.e., at a first pressure) in the positive direction to supply the liquid L to the interior of the preform 2 through the longitudinal flow path 24 (in the supply path), so that air in the interior of the preform 2 is discharged to the atmosphere (i.e., outside) through the gas outflow path 29. That is, by supplying the liquid L to the interior of the preform 2, a majority of air filled in the interior of the preform 2 is pushed out to the outside by the liquid L and so discharged. At this time, the first valve Va is opened, the second valve Vb is opened, the third valve Vc is closed, and the fourth valve Vd is closed. Additionally, the first rate in the air discharge step is preferably set to a level that does not substantially allow the preform to be stretched (or expanded).

Upon completion of the air discharge step, the liquid blow molding step is then performed. In the liquid blow molding step, in a state in which the blow nozzle 23 is engaged to the mouth 2a of the preform 2, the pressurized liquid L is supplied into the preform 2 by the pressurized liquid supply source 30 through the longitudinal flow path 24 (in the supply path). Consequently, the preform 2 is molded into the liquid container C which has a shape conforming to the cavity 11 of the blow-molding mold 10.

As illustrated in FIG. 3, in the present embodiment, at beginning of the liquid blow molding step, a rod purging step is performed first. In the rod purging step, firstly, the gas outflow path 29 is brought into the closed state while the gas inflow path 34 remains in the closed state, and the rod valve V1 is opened, and subsequently, the plunger 30b is operated in the positive direction at a second rate (that is, at a second pressure greater than the first pressure) while the sealing body 26 is maintained in the preliminary opening position, and the liquid L is discharged through the discharge port 28a of the discharge rod 28 to the liquid L in the interior of the preform 2 prior to the molding and/or in the course of the molding into the liquid container C. In the present embodiment, in the rod purging step and in the liquid blow molding step, all the first through the fourth valve Va through Vd are closed. The third valve Vc, however, may be opened in advance in preparation for a rod-ascending and depressurizing step.

Sometimes, a slight amount of air is entrapped into the liquid L that has been discharged through the discharge port 28a of the discharge rod 28 in the last headspace forming step, due to, for example, a process of vertical movement by the discharge rod 28. If the air is returned to the longitudinal flow path 24 (in the supply path) and accumulated each time the container C is molded, stability of the molding conditions (such as a pressure to which the liquid L is pressurized at the time of the liquid blow molding), moldability of the container, or the like may be deteriorated. The accumulation of the air may be prevented by the aforementioned rod purging step of discharging, to the interior of the preform 2, (preferably, an entire amount of) the liquid L that has been discharged through the discharge port 28a of the discharge rod 28 in the last headspace forming step. Additionally, in the aforementioned rod purging step, since the amount of the air supplied into the preform 2 is only small, an impact on moldability can be ignored. In the rod purging step, the discharge of the liquid L through the discharge port 28a is performed in the liquid L in the interior of the preform 2. The occurrence of bubbling in the preform 2 is therefore prevented.

Although in the present embodiment the rod purging step is performed by operating the plunger 30b in the positive direction at the second rate while the sealing body 26 is maintained in the preliminary opening position, the plunger 30b may also be operated in the positive direction at the second rate while the sealing body 26 is being displaced to the opening position or after the sealing body 26 is moved to the opening position. Further, to achieve a more stable discharge from the discharge port 28a in the rod purging step, it is preferable to displace the sealing body 26 to the closing position before opening the rod valve V1 and operating the plunger 30b in the positive direction (for example, at the second rate). Alternatively, an opening/closing valve may be provided in the third pipe P3, and the plunger 30b may be operated in the positive direction (for example, at the second rate), while the opening/closing valve is closed and while the rod valve V1 is opened (at this time, the sealing body 26 may be maintained in the preliminary opening position or may be moved to the opening position).

In the liquid blow molding step, once the rod purging step is completed, subsequently the sealing body 26 is caused to ascend from the preliminary opening position toward the opening position while the plunger 30b remains operated in the positive direction at the second rate, to thereby supply the liquid L pressurized to the second pressure to the interior of the preform 2 through the longitudinal flow path 24 (in the supply path) via the seat 24a. Consequently, as illustrated in FIG. 4, the preform 2 is molded into the liquid container C having the shape conforming to the cavity 11 of the blow-molding mold 10.

Herein, the liquid blow molding step is performed in a state in which the majority of the air in the interior of the preform 2 has been discharged to the outside by the air discharge step, when the pressurized liquid L is supplied to the interior of the preform 2, the liquid L is not entrained with air, and thus, the entrapment of air into the liquid L in the interior of the liquid container C is prevented.

In the present embodiment, as illustrated in FIGS. 3 and 4, a rod stretching step is performed in the course of the liquid blow molding step. In the rod stretching step, the trunk 2b of the preform 2 is stretched in the axial (i.e., longitudinal) direction by the stretching rod 28 which is configured to be displaced and advanced downward. The rod stretching step may also be performed prior to the liquid blow molding step. Performing the liquid blow molding step after or in the course of the rod stretching step (it is to be noted that the rod stretching step may be started after the start of the liquid blow molding step) allows biaxial stretch blow molding in which the preform 2 is blow molded while being stretched in the axial direction by the stretching rod 28, thereby permitting the preform 2 to be molded into the liquid container C with the predetermined shape with even higher accuracy. The liquid blow molding step may be, however, performed without performing the rod stretching step. FIG. 1 illustrates a state in which the stretching rod 28 is in an original position. The lower end surface of the stretching rod 28, in the original position, does not need to be arranged on the lower end surface of the sealing body 26, such as at a height illustrated in FIG. 1, and may be arranged above or below the height.

Figure 5:
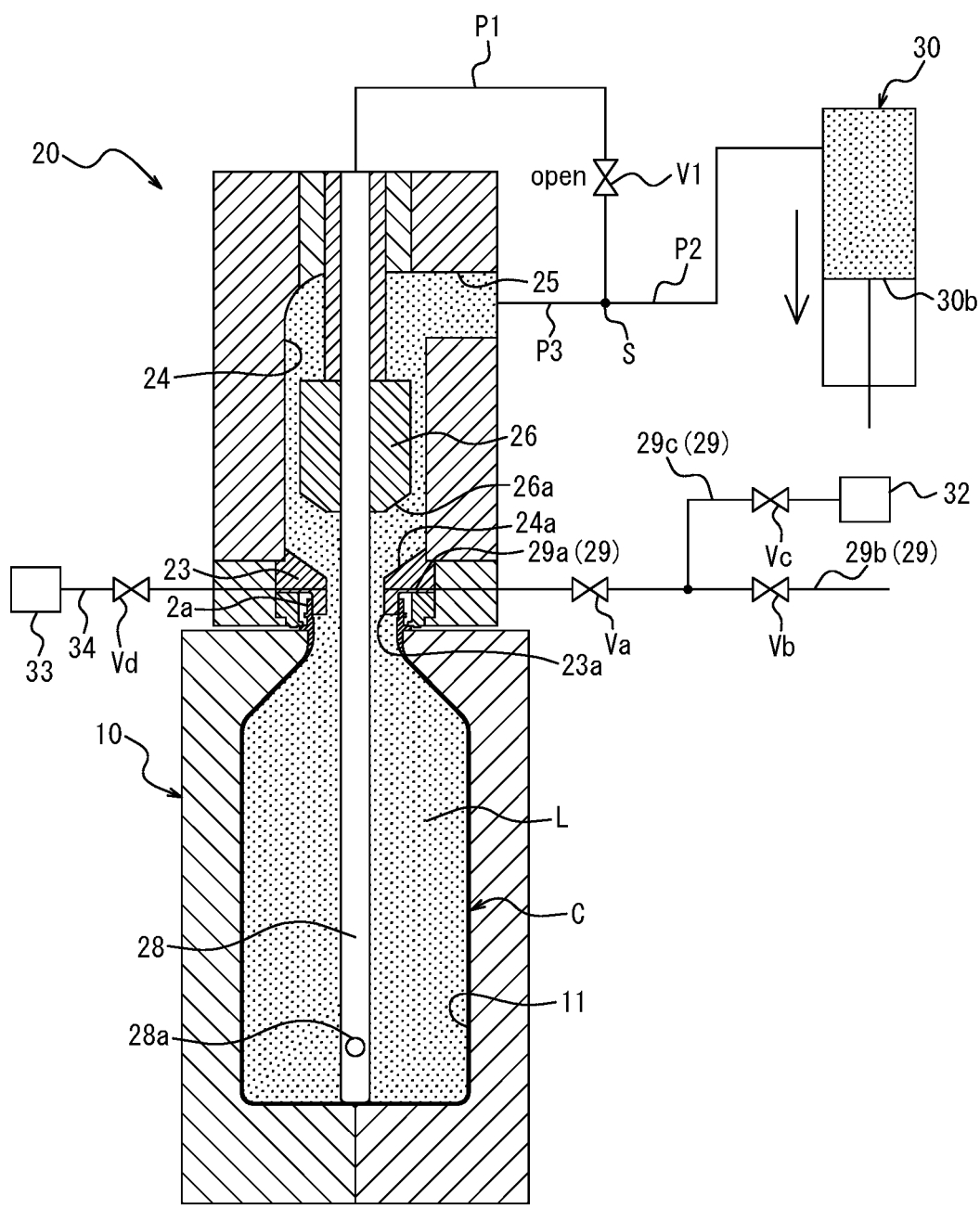
FIG. 5 illustrates the liquid container manufacturing apparatus when a first stage of suck-back is being performed in a headspace forming step.

Once the liquid blow molding step is completed, the headspace forming step is subsequently performed. As illustrated in FIG. 5, in the present embodiment, in the headspace forming step, a first stage of suck-back is performed first (that is, the liquid L is discharged from the interior of the liquid container C through the supply path by operating the pressurized liquid supply source 30 in the drawing direction). In the first stage of suck-back, as illustrated in FIG. 5, the sealing body 26 is in the opening position, the gas inflow path 34 and the gas outflow path 29 are both in the closed state, and the rod valve V1 remains opened (it is to be noted that the rod valve V1 may also be closed), the plunger 30b is operated in the opposite direction (i.e., drawing direction) by a predetermined operation amount, and a predetermined amount of the liquid L is sucked back from the interior of the molded liquid container C into the longitudinal flow path 24 (in the supply path). By the first stage of suck-back, a positive pressure state in the interior of the container C may be cancelled (or may even be brought into a negative pressure state), thereby preventing the liquid L from entering the gas inflow path 34 from the interior of the container C when the gas inflow path 34 is brought into the pressurized state later. Further, by performing the first stage of suck-back through the longitudinal flow path 24 (in the supply path), the liquid L may be discharged more quickly than when the first stage of suck-back is performed only through the discharge port 28a of the discharge rod 28, whereby the positive pressure state in the interior of the container C may be promptly cancelled. The amount to be sucked back in the first stage of suck-back is preferably within an amount small enough to prevent the slight amount of air entrapped into the liquid L in the interior of the molded container C from being returned to the longitudinal flow path 24 (supply channel) as much as possible. The first stage of suck-back, however, may be omitted.

Figure 6:
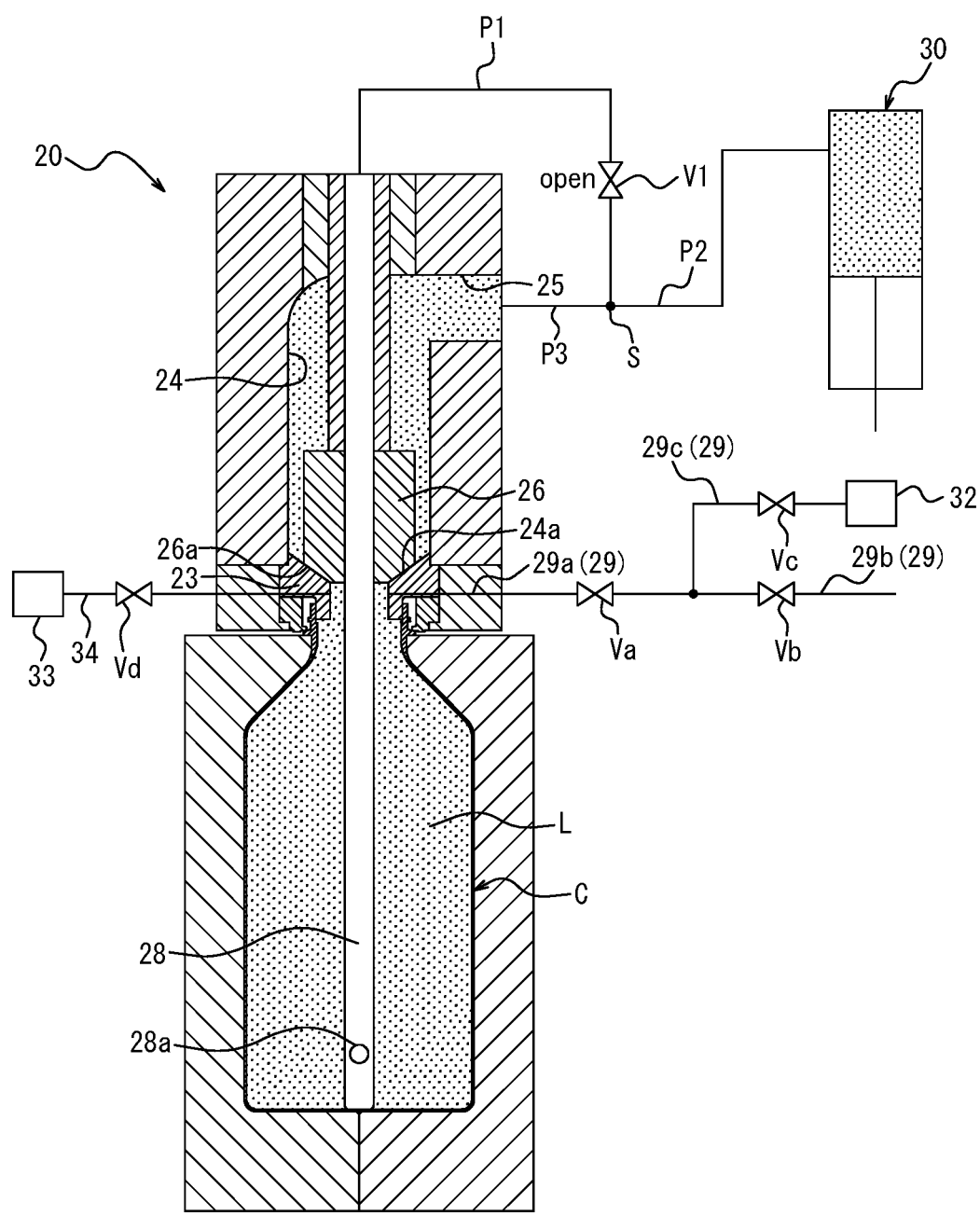
FIG. 6 illustrates the liquid container manufacturing apparatus when a supply path is closed from a state illustrated in FIG. 5 in the headspace forming step.

In the headspace forming step according to the present embodiment, once the first stage of suck-back is completed, the sealing body 26 is displaced to the closing position (refer to FIG. 6), the gas inflow path 34 is brought into the pressurized state while the gas outflow path 29 remains in the closed state, and a second stage of suck-back is performed (refer to FIG. 7). At this time, as illustrated in FIG. 7, the first through the third valve Va through Vc are closed, and the fourth valve Vd is opened. The third valve Vc may be, however, opened in advance in preparation for the rod-ascending and depressurizing step. In the second stage of suck-back, the rod valve V1 is opened, and the (plunger 30b of) the pressurized liquid supply source 30 is operated in the drawing direction in a state in which the longitudinal flow path 24 (in the supply path) is closed by the sealing body 26, to thereby discharge the liquid L from the interior of the liquid container C through the discharge port 28a provided in the discharge rod 28 extending to the interior of the liquid container C through the blow nozzle 23, so that the headspace HS will be formed in the liquid container C. In the present embodiment, the second stage of suck-back is performed while the pressurized gas is supplied to the interior of the preform 2 through the gas inflow path 34, and therefore, the discharge of the liquid L through the discharge port 28a is accelerated. The assist by the pressurized gas is effective especially when the liquid L as the content liquid has a high viscosity. Additionally, in the second stage of suck-back, it is possible to monitor the negative pressure in an interior of the discharge rod 28 caused by operating the pressurized liquid supply source 30 in the drawing direction, and stop executing the assist using the pressurized gas at a time when the negative pressure changes to the positive pressure in response to the pressurized gas supplied from the gas inflow path 34. This prevents air from being entrapped into the discharge port 28a when, after the formation of the headspace HS, the discharge rod 28 is caused to ascend and the discharge port 28a passes through the headspace HS. The headspace HS may, however, also be formed by discharging the liquid L through the discharge port 28a by using only the pressurized gas supplied from the gas inflow path 34 (that is, by discharging the liquid L from the interior of the liquid container C through the discharge port 28a of the discharge rod 28, by introducing the pressurized gas into the interior of the liquid container C in a state in which the supply path is closed, without operating the pressurized liquid supply source 30 in the drawing direction).

By discharging the liquid L through the discharge port 28a as in the present embodiment, the liquid L may be discharged from a lower portion with a lower level of air entrapment compared with a case in which the liquid L is discharged through (the seat 24a of) the longitudinal flow path 24. Accordingly, when the rod purging step is performed, it is not necessary in the rod purging step to return the entire amount of the liquid L that has been discharged through the discharge port 28a (it is sufficient to return the amount of the liquid L in which air entrapment is probable). Specifically, in the present embodiment, as illustrated in FIG. 7, the liquid L is discharged from the interior of the liquid container C through the discharge port 28a located in a lower half portion LP of the liquid container C (i.e., a lower side portion when the height is vertically divided into two equal parts) with the lower level of air entrapment. Alternatively, the liquid L may also be discharged from the interior of the liquid container C through the discharge port 28a that is located in an upper half portion of the liquid container C instead. The discharging port 28a may be provided in plurality in the discharging rod 28 along the axial direction and/or a circumferential direction. The arrangement position, number, shape, etc. of each discharge port 28a can be appropriately determined in accordance with the type, nature, etc. of the liquid L. Further, the discharge rod 28 may be configured to switch the discharge port 28a between an open/closed state, and the discharge port 28a may be switched between the open/closed state at appropriate timing.

Further, in the headspace forming step, the amount of the liquid L discharged from the interior of the liquid container C through the discharge port 28a is less than or equal to an internal volume of the discharge path. This may prevent the discharged liquid L, along with air, from being entrapped into the supply path (i.e., the longitudinal flow path 24, the supply port 25, and the third pipe P3). From the above perspective, the amount of the liquid L discharged from the interior of the liquid container C through the discharge port 28a in the headspace forming step is preferably less than or equal to the internal volume of a portion in the discharge path that extends from the discharge port 28a to the rod valve V1. Further, according to the present embodiment, the pressurized liquid supply source 30 configured to pressurize the supply path can also be used for the purpose of the discharge, so as to simplify the configuration of the nozzle unit 20. The amount of the liquid L discharged from the interior of the liquid container C through the discharge port 28a in the headspace forming step may be, however, greater than the internal volume of the discharge path.

In the present embodiment, once the headspace forming step is completed, the rod-ascending and depressurizing step is performed. In the rod-ascending and depressurizing step, as illustrated in FIG. 8, the discharge rod (stretching rod) 28 is caused to ascend and returned to the original position. Further, the gas inflow path 34 is brought into the closed position, the gas outflow path 29 is brought into the drawing state, and the rod valve V1 is closed. After that, the nozzle unit 20 is caused to ascend, and the liquid container C is removed from the blow-molding mold 10. Then, the pressurized liquid supply source 30 is filled, and processing moves to the standby step illustrated in FIG. 1.

As described above, in the present embodiment, the gas inflow path 34 is provided separately from the gas outflow path 29. Accordingly, when the pressurized gas is supplied from the gas inflow path 34, backflow of the liquid L from the gas inflow path 34 may be prevented. That is, since the gas inflow path 34 is independent of the gas outflow path 29 so as not to be used as the discharge path from the blow nozzle 23, the occurrence of such backflow may be prevented. Further, by thus making the gas inflow path 34 independent of the gas outflow path 29, an overall circulation configuration of the gas inflow path 34 and the gas outflow path 29 may be simplified, and the flow path may be controlled with more ease. Further, by thus making the gas outflow path 29 independent of the gas inflow path 34 so as not to be used as the supply path to the blow nozzle 23, the occurrence of backflow of the liquid L may be prevented even if the liquid L flows into the gas outflow path 29 in the air discharge step, and a greater margin may be provided in the setting of conditions for the air discharge step.

Needless to say, the present disclosure is not limited to the above embodiment, and various changes may be made without departing the gist of the present disclosure.

For example, although the above embodiment illustrates an example for performing the liquid container manufacturing method according to the present disclosure using the liquid container manufacturing apparatus 1 having the configuration illustrated in FIG. 1, the liquid container manufacturing method according to the present disclosure may also be performed using a liquid container manufacturing apparatus having a different configuration or the like. Although the above embodiment uses the apparatus having the common path for the liquid that extends from the pressurized liquid supply source 30 to the branching portion S, the supply path for the liquid that extends from the branching portion S to the blow nozzle 23, and the discharge path for the liquid that extends from the branching portion S to the discharge port 28a provided in the discharge rod 28, it is possible to use, instead of the above apparatus, an apparatus having, for example, a supply path for the liquid that extends from the pressurized liquid supply source 30 to the blow nozzle 23, and a discharge path for the liquid that extends from a liquid drawing and pressurizing apparatus such as a plunger pump provided separately from the pressurized liquid supply source 30 to the discharge port 28a provided in the discharge rod 28. When such an apparatus is used, the rod purging step and the second stage of suck-back may be performed by the aforementioned liquid drawing and pressurizing apparatus as needed.

Although in the above embodiment the interior of the preform 2 is exposed to the atmosphere in the air discharge step by bringing the gas outflow path 29 into the exposed-to-atmosphere state, with the blow nozzle 23 being engaged to the mouth 2a of the preform 2, the present disclosure is not limited to the above embodiment. For example, in the air discharge step, a discharge path for air from the interior of the preform 2 to the outside may be achieved without engaging the blow nozzle 23 to the mouth 2a of the preform 2.

Although in the above embodiment the pressurized liquid supply source 30 is the plunger pump, the present disclosure is not limited to the above embodiment, and any of various configurations, such as other types of pump, that are capable of pressurizing the liquid L to a predetermined pressure and supplying the pressurized liquid L to the preform 2, and producing the negative pressure to suck back the liquid L may be employed.

Although, in the rod purging step in the above embodiment, the discharge of the liquid L from the discharge port 28a of the discharge rod 28 is performed in the liquid L in the interior of the preform 2 prior to the molding and/or in the course of the molding into the liquid container C, the present disclosure is not limited to the above embodiment. For example, in the rod purging step, the discharge of the liquid L from the discharge port 28a of the discharge rod 28 may be performed in the air. Further, although in the above embodiment the discharge of the liquid L from the discharge port 28a is performed in the liquid L in the interior of the preform 2 at all times in the rod purge step, an initial stage of the discharge may be performed in the air, and the subsequent discharge may be performed in the liquid L, for example. Further, it is possible to provide a step, performed prior to the rod purging step (e.g., prior to the standby step), of supplying the liquid L into the preform 2 in advance by using means other than the blow nozzle 23. Further, although in the above embodiment the rod purging step is performed in the course of the liquid blow molding step, the present disclosure is not limited to the above embodiment. For example, the rod purging step may be performed prior to the liquid blow molding step (e.g., prior to or in the course of the air discharge step, or between the air discharge step and the liquid blow molding step). Further, in the rod purging step, the discharge of the liquid L through the discharge port 28a of the discharge rod 28 may be performed in the liquid L in the interior of the liquid container C immediately after the container C is molded (prior to the first stage of suck-back), depending on conditions. The rod purging step, however, may also be omitted.

Although in the above embodiment the air discharge step is performed, the air discharge step may also be omitted.

As the preform 2, any of those with various shapes may be used in accordance with the shape or the like of the molded liquid container C.

REFERENCE SIGNS LIST

1 Liquid container manufacturing apparatus
2 Preform
2a Mouth
2b Trunk
10 Blow-molding mold
11 Cavity
20 Nozzle unit
20a Nozzle unit body
21 Body block
22 Support block
23 Blow nozzle
23a Liquid supply port
24 Longitudinal flow path
24a Seat
25 Supply port
26 Sealing body
26 Tapered surface
27 Shaft body
28 Discharge rod (stretching rod)
28a Discharge port
29 Gas outflow path
29a-29c First through third path
30 Pressurized liquid supply source
30a Cylinder
30b Piston (plunger)
31 Outflow opening
32 Drawing source
33 Pressurized gas supply source
34 Gas inflow path
35 Discharge branching portion
36 Inflow opening
C Liquid container
L Liquid
P1 First pipe
P2 Second pipe
P3 Third pipe
S Branching portion
V1 Rod valve
Va-Vd First through fourth valve
HS Headspace
LP Lower half portion

The invention claimed is:

1. A liquid container manufacturing method for manufacturing, from a synthetic resin preform, a liquid container containing a content liquid using a nozzle unit and a blow-molding mold, wherein
the nozzle unit includes a supply path for the liquid that extends to a blow nozzle, a discharge path for the liquid that extends to a discharge port provided in a discharge rod, a gas outflow path through which a gas flows out from the blow nozzle, and a gas inflow path which is provided separately from the gas outflow path and through which the gas flows into the blow nozzle, and a common path for the liquid that extends from the pressurized liquid supply source to a branching portion, and the supply path extends from the branching portion to the blow nozzle, and the discharge path extends from the branching portion to the discharge port provided in the discharge rod, the liquid container manufacturing method comprising:
a liquid blow molding step of molding the preform into the liquid container having a shape conforming to an inner surface of the blow-molding mold, by supplying the liquid pressurized by a pressurized liquid supply source to an interior of the preform through the supply path in a state in which the blow nozzle is engaged to a mouth of the preform; and
a headspace forming step of forming a headspace in the liquid container, by introducing the gas that is pressurized to an interior of the liquid container through the gas inflow path in a state in which the supply path is closed, thereby discharging the liquid from the interior of the liquid container through the discharge port provided in the discharge rod extending to the interior of the liquid container through the blow nozzle.

2. The liquid container manufacturing method according to claim 1, further comprising
an air discharge step, performed prior to the liquid blow molding step, of discharging air in the interior of the preform to outside through the gas outflow path, by supplying the liquid to the interior of the preform.

3. The liquid container manufacturing method according to claim 1, wherein,
in the headspace forming step, by operating the pressurized liquid supply source in a drawing direction, the liquid is discharged from the interior of the liquid container through the discharge port provided in the discharge rod.

4. A liquid container manufacturing method for manufacturing, from a synthetic resin preform, a liquid container containing a content liquid using a nozzle unit and a blow-molding mold, wherein
the nozzle unit includes a supply path for the liquid that extends to a blow nozzle, a discharge path for the liquid that extends to a discharge port provided in a discharge rod, a gas outflow path through which a gas flows out from the blow nozzle, and a gas inflow path which is provided separately from the gas outflow path and through which the gas flows into the blow nozzle, the liquid container manufacturing method comprising:
a liquid blow molding step of molding the preform into the liquid container having a shape conforming to an inner surface of the blow-molding mold, by supplying the liquid pressurized by a pressurized liquid supply source to an interior of the preform through the supply path in a state in which the blow nozzle is engaged to a mouth of the preform; and a headspace forming step of forming a headspace in the liquid container, by introducing the gas that is pressurized to an interior of the liquid container through the gas inflow path in a state in which the supply path is closed, thereby discharging the liquid from the interior of the liquid container through the discharge port provided in the discharge rod extending to the interior of the liquid container through the blow nozzle;
wherein in the headspace forming step, by operating the pressurized liquid supply source in a drawing direction before discharging the liquid from the interior of the liquid container through the discharge port provided in the discharge rod, the liquid is discharged from the interior of the liquid container through the supply path.

5. A liquid container manufacturing method for manufacturing, from a synthetic resin preform, a liquid container containing a content liquid using a nozzle unit and a blow-molding mold, wherein
the nozzle unit includes a supply path for the liquid that extends to a blow nozzle, a discharge path for the liquid that extends to a discharge port provided in a discharge rod, a gas outflow path through which a gas flows out from the blow nozzle, and a gas inflow path which is provided separately from the gas outflow path and through which the gas flows into the blow nozzle, the liquid container manufacturing method comprising:
a liquid blow molding step of molding the preform into the liquid container having a shape conforming to an inner surface of the blow-molding mold, by supplying the liquid pressurized by a pressurized liquid supply source to an interior of the preform through the supply path in a state in which the blow nozzle is engaged to a mouth of the preform; a headspace forming step of forming a headspace in the liquid container, by introducing the gas that is pressurized to an interior of the liquid container through the gas inflow path in a state in which the supply path is closed, thereby discharging the liquid from the interior of the liquid container through the discharge port provided in the discharge rod extending to the interior of the liquid container through the blow nozzle; and
a rod purging step of discharging, through the discharge port provided in the discharge rod, the liquid to the interior of the preform prior to the molding and/or in the course of the molding into the liquid container.

6. The liquid container manufacturing method according to claim 5, wherein,
in the rod purging step, an entire amount of the liquid that has been discharged from the interior of the liquid container through the discharge port in the last headspace forming step is discharged through the discharge port.

7. The liquid container manufacturing method according to claim 5, wherein,
in the rod purging step, the discharge of the liquid through the discharge port provided in the discharge rod is performed in the liquid.

8. The liquid container manufacturing method according to claim 1, wherein
an amount of the liquid discharged from the interior of the liquid container through the discharge port in the headspace forming step is less than or equal to an internal volume of the discharge path.

9. The liquid container manufacturing method according to claim 1, further comprising
a rod stretching step, performed in the course of the liquid blow molding step or prior to the liquid blow molding step, of stretching the preform in an axial direction by a stretching rod, wherein
the discharge rod is the stretching rod.

* * * * *